Figure 1:
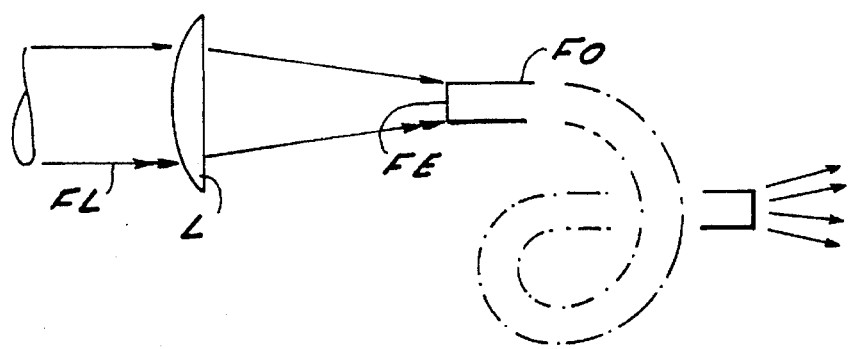

United States Patent [19]

Alfille

[11] Patent Number: 5,463,215
[45] Date of Patent: Oct. 31, 1995

[54] DEVICE FOR ALIGNING THE AXIS OF A LIGHT BEAM WITH THE AXIS OF AN OPTICAL FIBER

[75] Inventor: Jean-Pascal Alfille, Clamart, France

[73] Assignee: Commissariat a l'Energie Atomique, Paris, France

[21] Appl. No.: 145,242

[22] Filed: Nov. 3, 1993

[30] Foreign Application Priority Data

Nov. 13, 1992 [FR] France .................... 92 13660

[51] Int. Cl.⁶ .................. H01J 210/14; B23K 26/04
[52] U.S. Cl. ................... 250/206.1; 250/559.29; 219/121.78
[58] Field of Search ............... 250/203.1, 206.1, 250/206.2, 561, 548; 219/121.6–121.62, 121.75, 121.78, 121.83; 385/50, 52; 356/141, 152

[56] References Cited

U.S. PATENT DOCUMENTS

| | | | |
|---|---|---|---|
| 3,423,593 | 1/1969 | Chinnock | 250/206.2 |
| 3,723,013 | 3/1973 | Stirland et al. | 250/206.2 |
| 3,861,806 | 1/1975 | Born | 250/206.2 |
| 3,930,150 | 12/1975 | Marantette | 250/203.1 |
| 4,568,361 | 9/1989 | Chande et al. | |
| 4,978,834 | 12/1990 | Griffaton | |
| 4,983,796 | 1/1991 | Griffaton | |
| 4,987,293 | 1/1991 | Baciak | 250/206.1 |
| 5,054,917 | 10/1991 | Pepin et al. | 250/206.2 |
| 5,065,005 | 11/1991 | Encaoua et al. | 250/206.2 |
| 5,118,922 | 6/1992 | Rothe | 250/206.1 |

FOREIGN PATENT DOCUMENTS 1210077 8/1986 Canada.
0367648 5/1990 European Pat. Off..

OTHER PUBLICATIONS

SPIE–Optical Alignment, vol. 251, Jul. 29, 1980, pp. 131–135, D. M. Swain, "Centration of a Linear Cone to the Optical Axis of a Reflaxicon".

*Primary Examiner*—Stephone B. Allen
*Attorney, Agent, or Firm*—Oblon, Spivak, McClelland, Maier & Neustadt

[57] ABSTRACT

A device for aligning a light beam with an optical fiber in order to introduce the beam into the fiber. The device includes a sample-taking device to sample part of the light beam which falls along the periphery of a circle which has a center on the axis of the fiber. The sampled light is then detected in order to analyze the angular distribution of the corresponding light intensity. The angular distribution becomes uniform when the axis of the light beam coincides with the axis of the optical fiber.

10 Claims, 8 Drawing Sheets

DEVICE FOR ALIGNING THE AXIS OF A LIGHT BEAM WITH THE AXIS OF AN OPTICAL FIBER

DESCRIPTION

The present invention relates to a device for checking the centring of a light beam, i.e. a device for checking the coincidence between the axis of a light beam and a working axis.

The invention more particularly applies to the introduction of a light beam into an optical fibre and especially the introduction of a light beam from a power laser into an optical fibre.

The invention is more particularly used in the field of power laser machining.

In methods for the transmission of a power laser beam by an optical fibre, the problem occurs of introducing the laser beam into said fibre. In view of the fact that the diameter of the optical fibres used in the industry varies between 0.6 and 1 mm, the centring of a focussing point of a light beam (point having a diameter of approximately 0.3 to 0.5 mm) on an entrance face of an optical fibre becomes critical, particularly for a power laser beam, said power e.g. exceeding 1 kW.

Axial focussing and/or centring defects on the entrance face of an optical fibre lead to heating and rapid destruction of said entrance face.

For the remote performance of material treatment operations such as drilling, welding, cutting or material surface treatments, it is known to use a light beam from a YAG laser, said beam being transported by an optical fibre over a distance ranging from a few meters to a few hundred meters, after which the beam is reconditioned and focussed by a focussing head onto the material to be treated.

At present, YAG lasers have power levels exceeding 1 kW and YAG lasers able to supply power levels of several kW will soon be available.

In the field of machining by power YAG laser, it is of interest to transport the light beam from such a laser by an optical fibre for a number of reasons. On the one hand, said transport by optical fibre makes it possible to connect the YAG laser source to a robot for carrying out cutting, drilling, welding or three-dimensional surface treatment operations in an industrial medium. On the other, such a transport also makes it possible to connect the YAG laser source to a robot, which is introduced into an active cell for interventions in a hostile medium, e.g. for dismantling or repair operations.

In this connection reference can be made to EP-A-367648, which relates to a process and an apparatus for the remote welding of a sleeve in a tube e.g. forming part of a steam generator or boiler of a nuclear power station.

It is not easy to introduce a laser beam into an optical fibre, particularly a beam from a high power YAG laser. The main problem to be solved is to ensure maximum penetration of the laser beam into the optical fibre. For this purpose and as can be seen from FIG. 1, a light beam FL from a not shown laser is focussed onto the entrance face FE of an optical fibre FO by means of a focussing lens L.

To solve the above problem, it is not only necessary for the fibre to resist a high light power density, but it is also necessary to minimize a centring fault, as well as an axial focussing fault in order to reduce the heating of the fibre entrance face.

Figure 2:
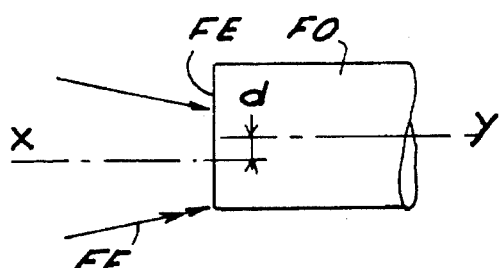
Figure 2:
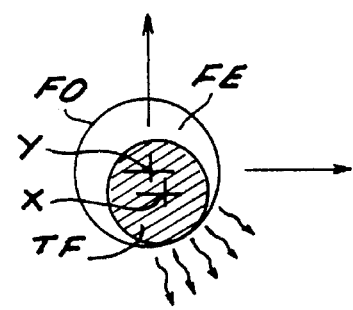

FIG. 2A shows the axis of symmetry X of the focussed beam FF, as well as the axis of symmetry Y of the optical fibre FO (or more specifically the axis of symmetry of the core of said fibre). The centring error or defect is due to the existence of a variation d between the axes X and Y. This centring error is also visible in FIG. 2B, which shows the non-coincidence between the centre of the entrance face FE and the centre of the focal spot TF of the beam on said entrance face.

The distance or variation d between the two axes X and Y leads to a heating of the edge of the optical fibre, as well as to temperature gradients which no longer have a symmetry of revolution and ultimately bring about the destruction of the entrance face of the fibre.

Figure 3:
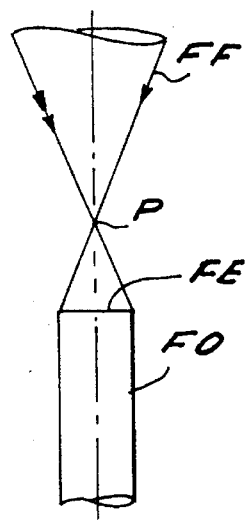
Figure 3:
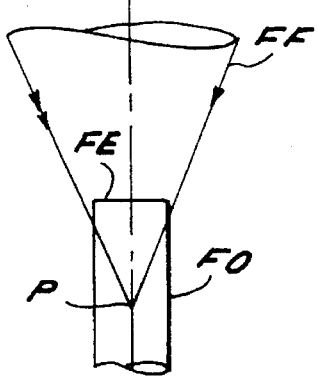

The second defect, namely the axial focussing error with respect to the entrance face of the optical fibre is illustrated in FIGS. 3A and 3B. It is in fact of a double nature, namely either the focussing "point" P of the laser beam FF is above the entrance face FO of the optical fibre (FIG. 3A), or the focussing "point" P is within the optical fibre FO (FIG. 3B).

Both in the case of an overfocussing (FIG. 3A) and an underfocussing (FIG. 3B), heating takes place to the periphery of the entrance face FE of the fibre FO and ultimately said entrance face is destroyed.

The present invention is more particularly directed at identifying centring errors, as well as axial focussing errors liable to appear inter alia during material treatment operations (e.g. machining operations for mechanical parts) by means of a laser in order to correct these errors in real time.

YAG lasers have the disadvantage referred to hereinbefore. During a change of an emission parameter of a YAG laser, e.g. the shot frequency, the duration of each pulse or the energy of each pulse, there can be dimensional variations with respect to the diameter of the beam from the laser and pointing variations relative to said beam.

Even when using an afocal optical system for reducing these instabilities, axial focussing and beam centring variations persist on the entrance face of the optical fibre. Such errors are very disturbing for optical fibres having a small cross-section, e.g. optical fibres with a diameter of 0.6 mm. These errors, which are intrinsic to the laser source, also increase with the power of said source.

Thus, the check of the state of the focussing of a laser beam on the entrance face of an optical fibre is important for the life of the latter.

The present invention aims at solving the problem of checking the centring and axial focussing of a light beam on the entrance face of an optical fibre, as well as minimizing the heating thereof.

More generally, the invention aims at solving the problem of checking the centring of a light beam, i.e. checking the coincidence between the axis of said beam and a working axis (which in the case considered here is the optical fibre core axis).

To solve this problem, the device according to the invention is characterized in that it comprises sample taking and detection means for on the one hand sampling a peripheral part of the light beam along a circle, whose axis is the working axis, and on the other hand detecting the thus sampled light, in order to analyze the angular distribution of the corresponding light intensity, said angular distribution being uniform when the axis of the light beam coincides with the working axis.

Admittedly Canadian patent 1 210 077 already discloses a process for the treatment of a material by laser using an optical fibre, whilst U.S. Pat. No. 4 868 361 discloses a coupling device for optical fibres transporting high power laser beams, but neither of these two documents refers to an important feature of the invention, namely the sampling of part of the light beam along a circle, whose axis is said working axis.

According to a first special embodiment of the device according to the invention, the sample taking and detection means incorporate a first, truncated cone-shaped mirror, whose axis coincides with the working axis and which has at its apex a hole centred on the working axis and which serves to sample said part of the light beam along said circle and for reflecting the thus sampled light, a second truncated cone-shaped mirror, whose axis also coincides with the working axis, which is integral with the first truncated cone-shaped mirror and surrounds the latter and which reflects the light reflected by said first truncated cone-shaped mirror and means for detecting the light reflected by the second truncated cone-shaped mirror.

These detection means can comprise sampling means for sampling the light reflected by the second truncated cone-shaped mirror and a photodetector for detecting the successively formed light samples, said photodetector permitting the analysis of said angular distribution.

In a first embodiment the sampling means comprise a third mirror located on the path of the light reflected by the second truncated cone-shaped mirror in order to intercept part of said light, which is provided for reflecting towards the photodetector the thus intercepted part and which rotates about an axis which encounters the working axis and means for rotating the third mirror about said rotation axis, so as to successively form the light samples.

In another embodiment, said sampling means incorporate a member which is positioned facing the second truncated cone-shaped mirror and which has a central hole to permit the passage of the light beam directed towards the sample taking means and a lateral hole for permitting the passage of part of the light reflected by said second truncated cone-shaped mirror and which is rotatable about the working axis, means for rotating said member around the working axis, so that said member allows the passage of successive light samples and a third mirror provided with a central hole for permitting the passage of the light bean directed towards the sample taking means and which receives successive light samples and reflects them towards the photodetector.

In another embodiment, the detection means incorporate a third mirror provided with a central hole for permitting the passage of the light bean directed towards the sample taking means and which is positioned facing the second truncated cone-shaped mirror for intercepting the light reflected by the latter and a bidimensional photodetector for receiving the light reflected by said third mirror, said photodetector making it possible to bring about an overall analysis of said angular distribution.

According to a second special embodiment of the device according to the invention, the sample taking and detection means incorporate a sample taking and sampling assembly incorporating a first mirror inclined with respect to the working axis and which serves to sample part of the beam, on the periphery thereof, along said circle and for reflecting said sampled part, a second mirror inclined with respect to the working axis, which is integral with the first inclined mirror and which reflects the light reflected by said first inclined mirror and means for rotating the assembly formed by the first and second inclined mirrors about the working axis, a third mirror having a central hole for allowing the passage of the light beam directed towards the sample taking and sampling assembly and which is provided for intercepting the light reflected by the second inclined mirror and a photodetector for detecting the light reflected by said third mirror, said photodetector permitting the analysis of said angular distribution.

In this case, the device according to the invention also preferably comprises means for the translation of the assembly formed by the first and second inclined mirrors perpendicular to the working axis. This makes it possible to adapt the device to light beams having different diameters.

The present invention also relates to a system for introducing a light beam into an optical fibre, said system having means for focussing the light beam on the entrance face of the optical fibre, said system being characterized in that it also comprises the device according to the invention, in that the working axis is the optical fibre core axis and in that said circle is in the plane of the entrance face of said fibre, said device then making it possible to also check the focussing of the light beam on the entrance face of the fibre, the light intensity of the detected light being at a minimum when said focussing is performed.

When use is made of a device according to the invention having two truncated cone-shaped mirrors for sampling the light beam, said system can also comprise means for injecting a fluid within the first truncated cone-shaped mirror towards the entrance face of the optical fibre in order to cool the latter.

The invention is described in greater detail hereinafter relative to non-limitative embodiments and with reference to the attached drawings, where in show:

FIG. 1, already described, diagrammatically the focussing of a laser beam on the entrance face of an optical fibre.

FIG. 2A, already described, diagrammatically a centring error of the thus focussed beam.

FIG. 2B, already described, a diagrammatic front view of the optical fibre also showing the centring error.

FIG. 3A, already described, diagrammatically an overfocussing error.

FIG. 3B, already described, diagrammatically an underfocussing error.

Figure 4:
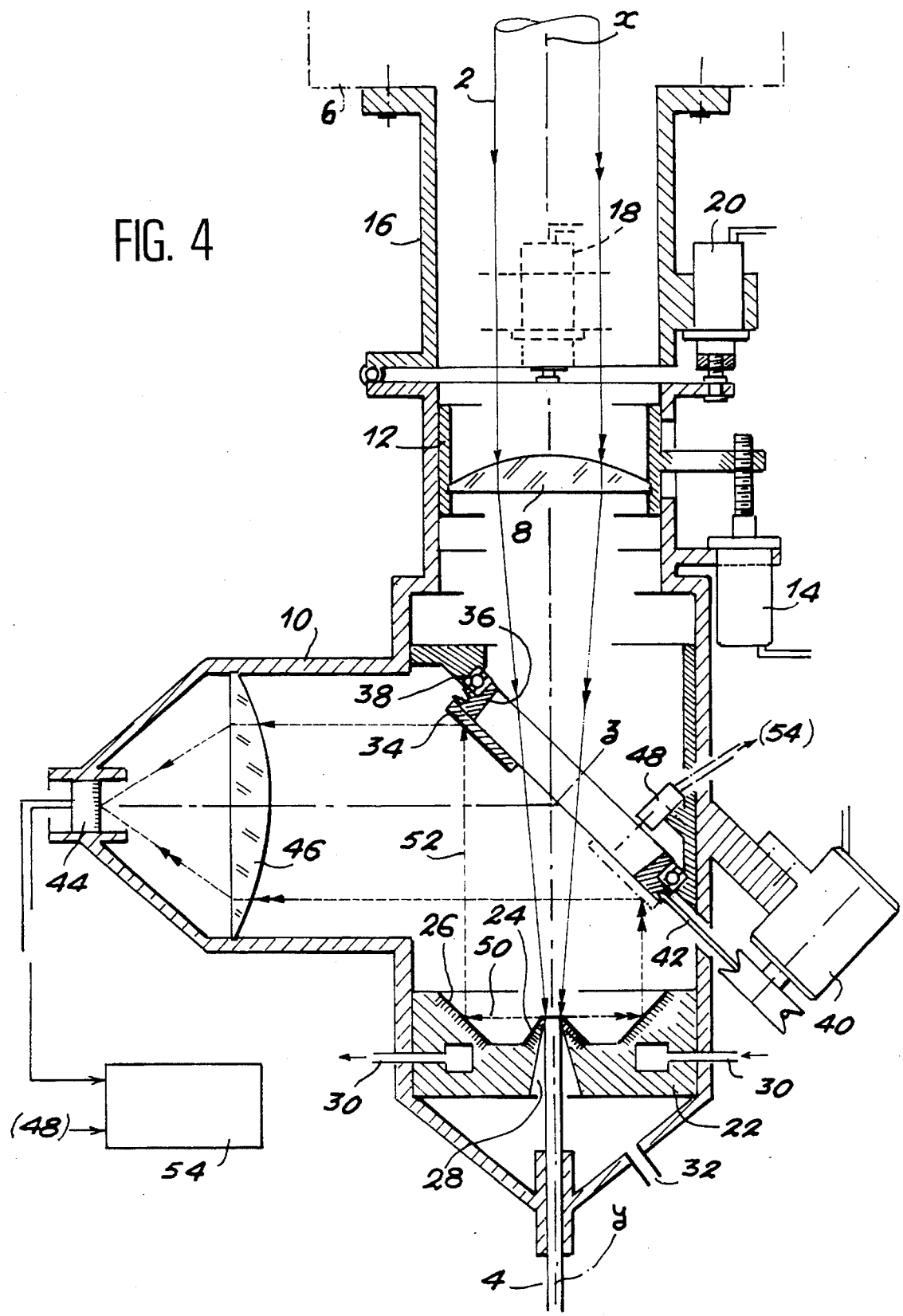

FIG. 4 A diagrammatic sectional view of a first embodiment of the device according to the invention.

Figure 5:
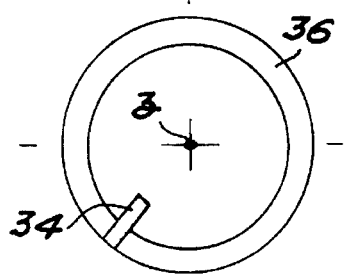

FIG. 5 Diagrammatically a mirror used in the device shown in FIG. 4.

Figure 6:
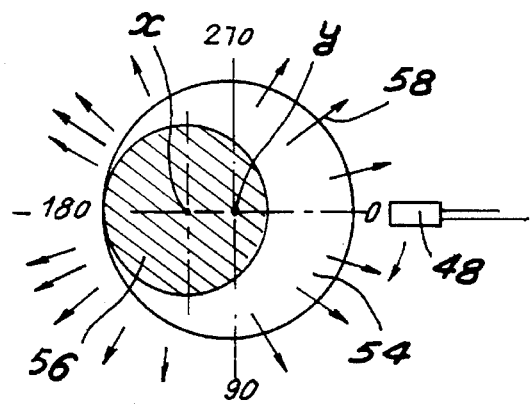
Figure 6:
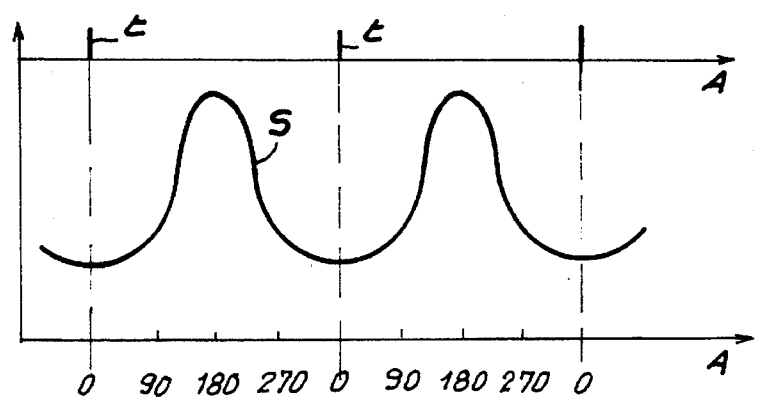

FIG. 6A Diagrammatically a centring error of the light beam in the device shown in FIG. 4.

FIG. 6B Light intensity variations detected with the device of FIG. 4 and due to said centring error.

Figure 7:
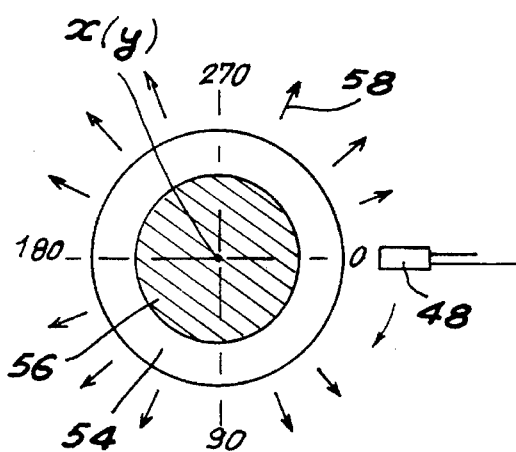
Figure 7:
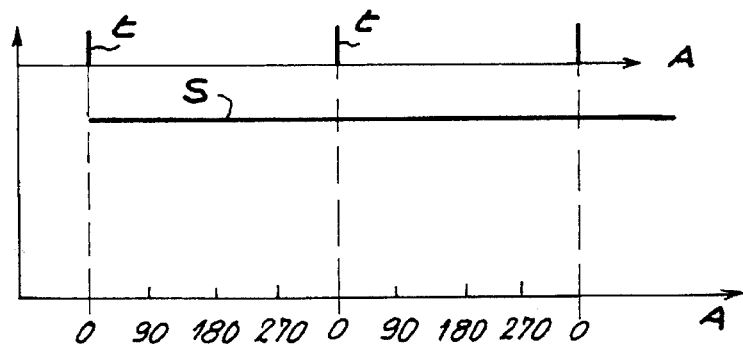

FIG. 7A Diagrammatically a recentring of the light beam.

FIG. 7B The light intensity variations detected after said recentring.

Figure 8:
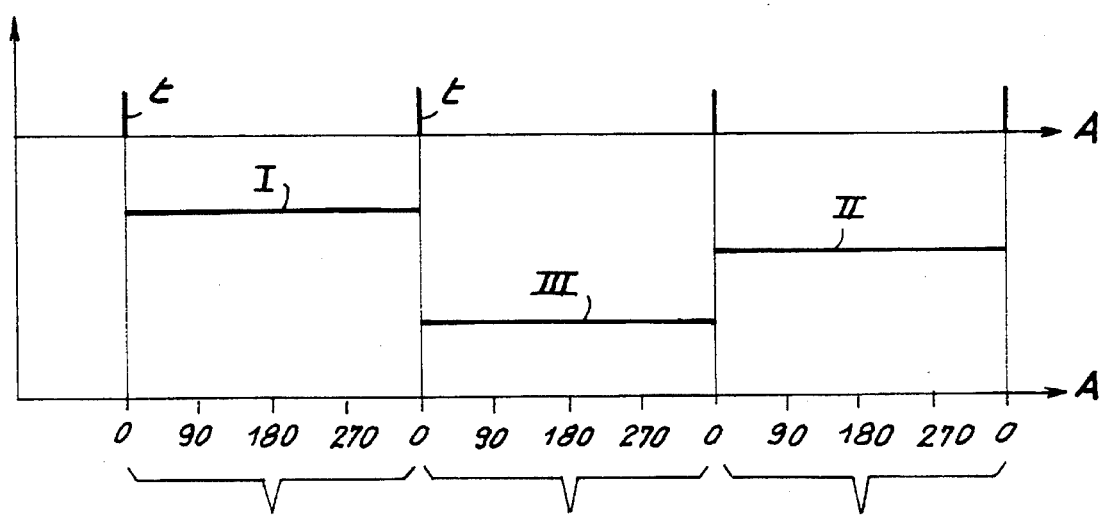

FIG. 8 Diagrammatically the correction of the axial focussing which can be carried out after checking the said focussing with the device of FIG. 4.

Figure 9:
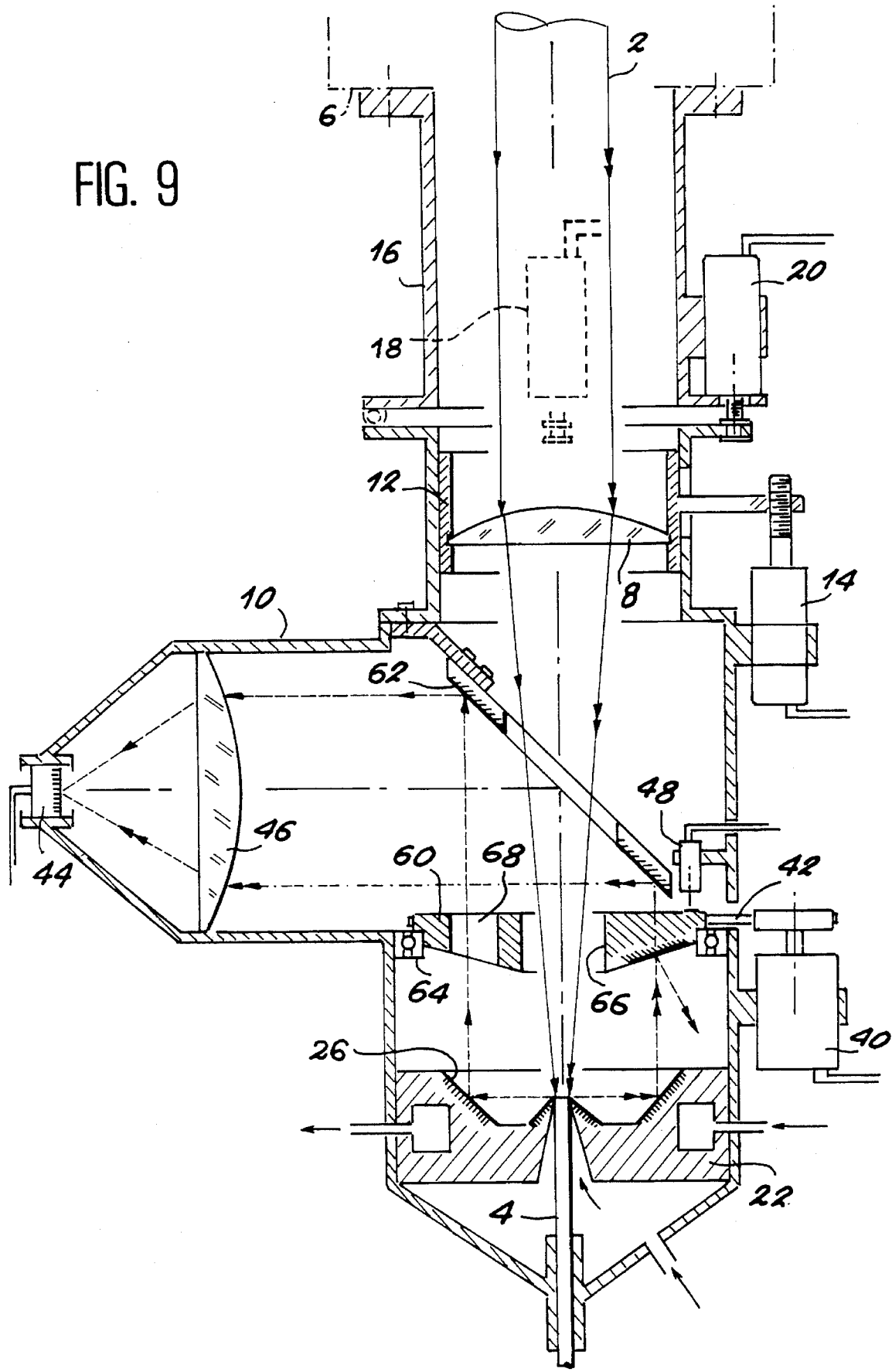

FIG. 9 A diagrammatic sectional view of a second embodiment of the device according to the invention.

Figure 10:
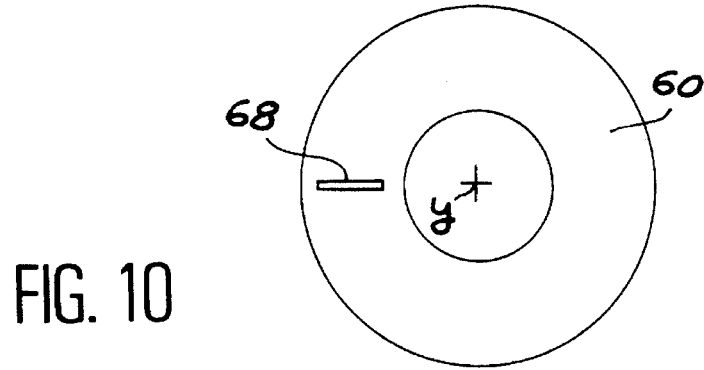

FIG. 10 Diagrammatically the slit of a rotary member forming part of the device of FIG. 9.

Figure 11:
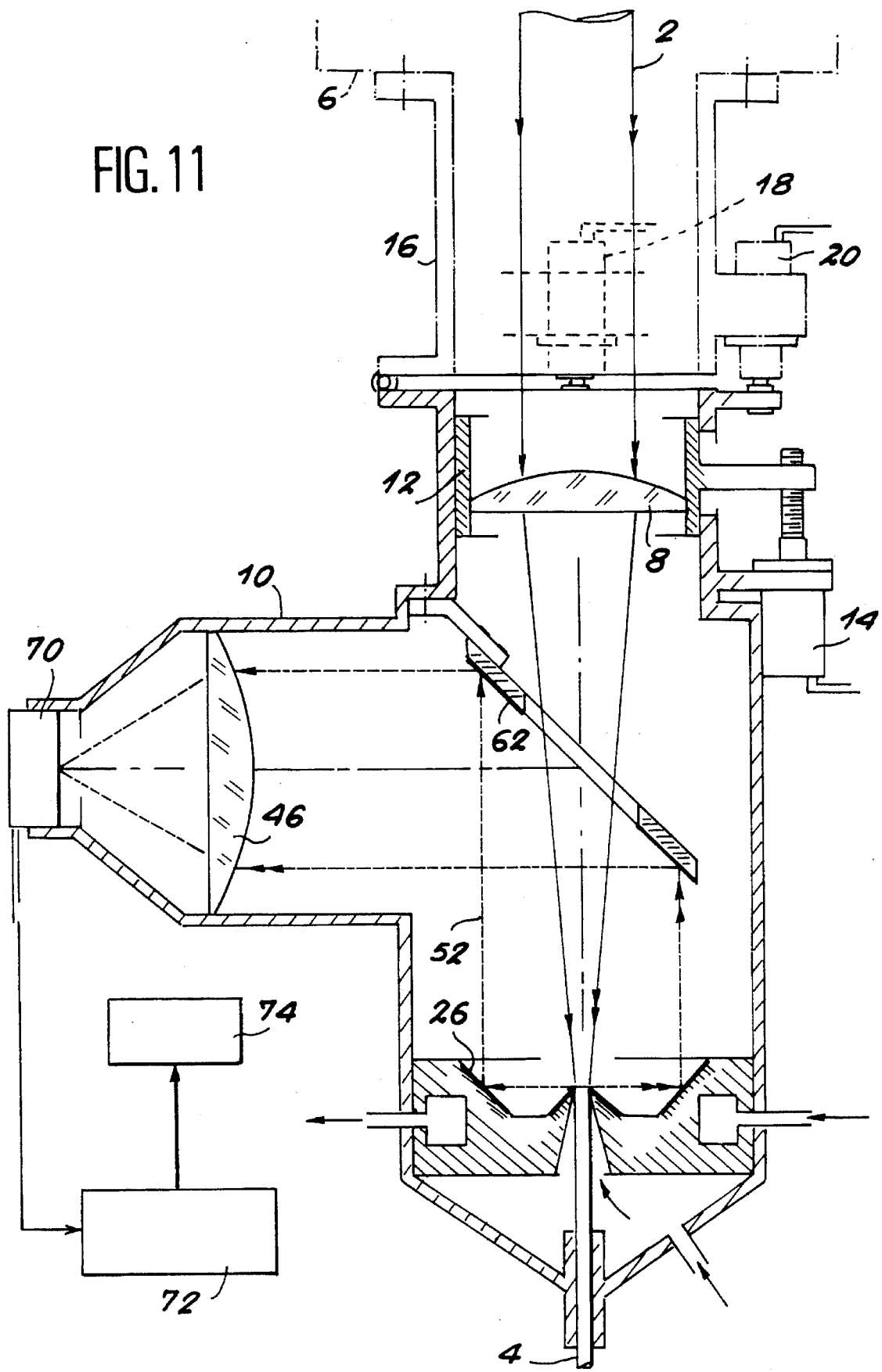

FIG. 11 A diagrammatic sectional view of a third embodiment of the device according to the invention having a bidimensional detector.

Figure 12:
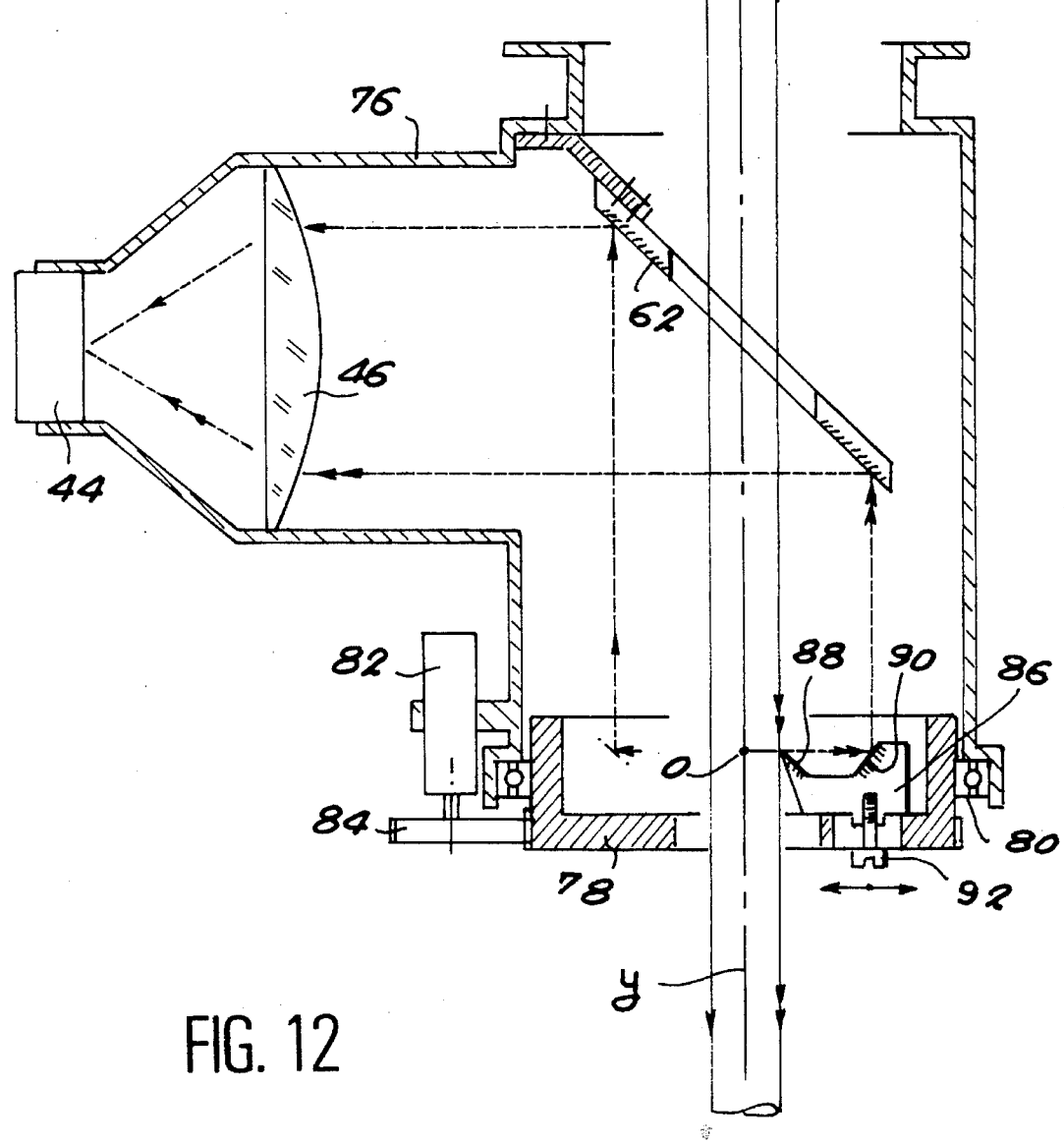

FIG. 12 A diagrammatic sectional view of a fourth embodiment of the device according to the invention.

Figure 13:
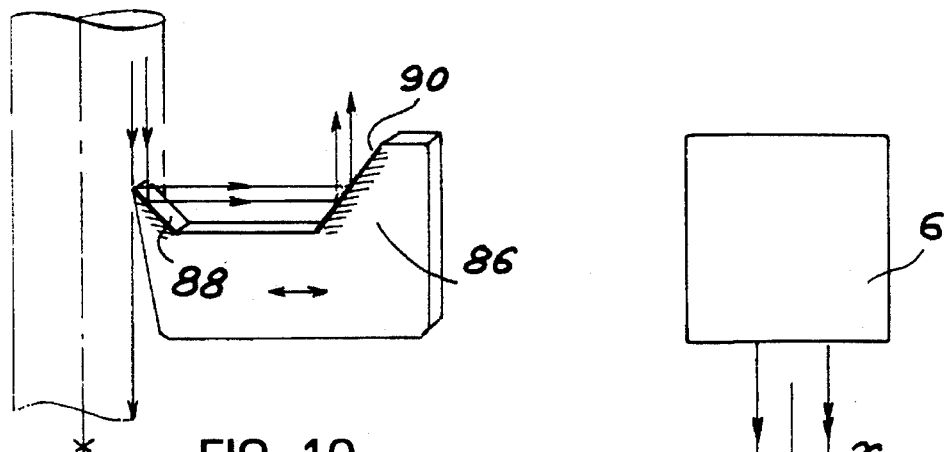

FIG. 13 Diagrammatically an assembly of two plane mirrors used in the device of FIG. 12.

Figure 14:
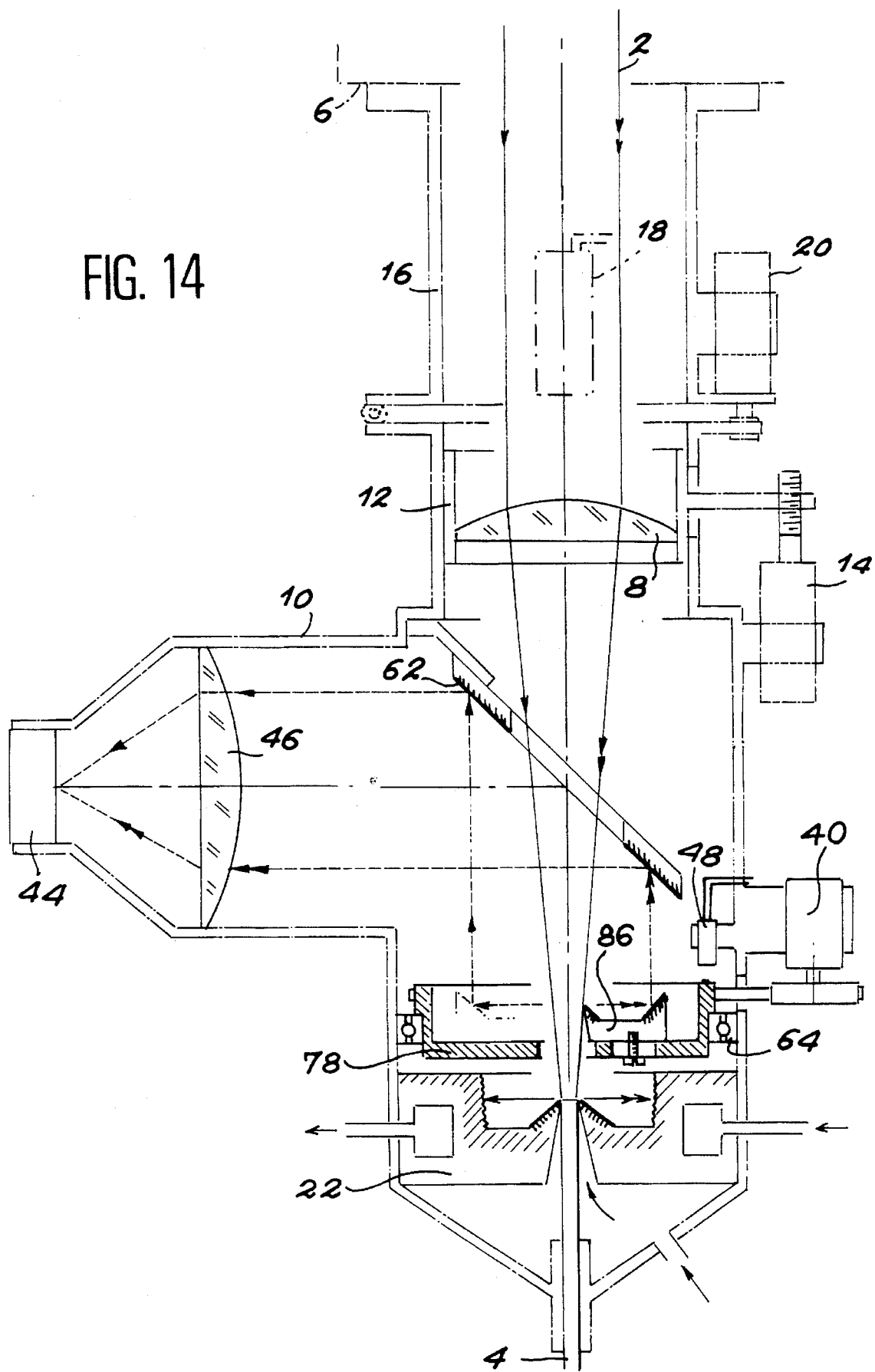

FIG. 14 A diagrammatic sectional view of a fifth embodiment of the device according to the invention.

FIG. 4 is a diagrammatic sectional view of a device according to the invention, which is incorporated into a focussing system of a laser beam 2, whose axis carries the reference x, into an optical fibre 4, whose axis is y (it is more specifically the core axis of said fibre).

FIG. 4 shows the laser 6, which emits the beam 2 and a focussing lens 8 by means of which the beam 2 is focussed onto the entrance face of the fibre 4.

The device according to the invention making it possible to check the centring of the beam 2, i.e. the coincidence between the axes x and y, as well as the focussing of said beam on the entrance face of the fibre is installed in a focussing frame 10. The lens 8 is mounted in the frame 10 on a support 12, which is displaceable in translation parallel to the axis y by means of an electric motor 14.

Before penetrating the focussing head or frame 10, the laser beam 2 traverses a tubular body 16, which is rigidly integral with the laser 6.

Two electric motors 18, 20 are provided for varying the orientation of the focussing head 10 with respect to the tubular body 16, so that when necessary it is possible to recentre the focussing point on the entrance face of the optical fibre.

The device according to the invention and which is shown in FIG. 4 comprises a light sample taking assembly 22 fixed in the focussing head 10 and which has a first truncated cone-shaped mirror 24 and a second truncated cone-shaped mirror 26 surrounding the mirror 24 and having the same axis as the latter, namely the axis y.

As can be seen in FIG. 4, the cones whose shapes are adopted by the mirrors 24 and 26 have in each case a cone semi-angle of 45° and the cone corresponding to the mirror 24 converges towards the lens 8, whilst the cone corresponding to the mirror 26 converges in the opposite direction. The sample taking assembly 22 has a conical hole 28 of axis y, which issues at the apex of the truncated cone-shaped mirror 24.

The optical fibre 4 is installed in the focussing head 10 and its entrance face, onto which is focussed the light beam, is level with the upper edge of the mirror 24, the diameter of the hole 28 at this level being slightly larger than that of the optical fibre 4. The sample taking assembly 22 has water circulating means 30 for cooling said assembly 22.

A cooling fluid, such as e.g. air, penetrates the focussing head 10 by an entrance 32 in order to then pass through the truncated cone-shaped hole 28, which makes it possible to cool the end of the fibre 4 receiving the focussed laser beam and also helps to maintain the fibre centred in the truncated cone-shaped mirror 24.

The device according to FIG. 4 also comprises a thin mirror 34, which is fixed to a ring 36 as can be seen in FIG. 5. The latter is mounted in rotary manner by means of a ball bearing 38 in the focussing head 10 between the lens 8 and the sample taking assembly 22.

This installation is such that the ring is traversed by the focussed beam 2, the mirror 34 faces the truncated cone-shaped mirror 26, the axis z of the ring 36, to which the mirror 34 is perpendicular, meets the axis y and forms an angle of 45° therewith.

An electric motor 40 outside the focussing head 10 and which is integral therewith, permits the rotation of the ring 36 and therefore the mirror 34 about the axis z by means of a belt 42, which traverses a hole in the wall of the focussing head 10.

The focussing head 10 also carries a photodetector 44, which receives the light liable to be reflected by the thin mirror 34, by means of a focussing lens 46 provided for focussing said light onto the photodetector 44.

The device according to the invention shown in FIG. 4 also comprises a synchronizing assembly 48 for supplying synchronizing signal for each rotation of the thin mirror 34. This assembly 48, which is fixed with respect to the focussing head 10, e.g. comprises a light source for illuminating the rear face of the thin mirror 34 (whose front face faces the assembly 22), as well as a photodetector for detecting the light reflected by said rear face.

This rear face carries a not shown band or strip, which does not reflect the said light so that, for each rotation of the thin mirror 34, a synchronizing pulse is produced by the photodetector when said strip passes in front of the synchronizing assembly.

An explanation will now be given of the operation of the device according to the invention shown in FIG. 4. The beam from the laser 6 is focussed by the lens 8 onto the entrance face of the fibre 4. A peripheral part of said focussed beam does not penetrate the fibre 4. This part is intercepted or sampled by the conical surface of the mirror 24, said interception thus taking place along the circle formed by the upper edge of the mirror 24 (at the point where the truncated cone-shaped hole 28 issues).

It should be noted in this connection that one of the advantages of the invention is that sampling or interception takes place of part of the beam which is lost for the fibre. This sampled part is reflected by the mirror 24 in the form of a planar light beam 50, which is in turn transformed, by reflection on the truncated cone-shaped mirror 26, into a tubular light beam 52. This tubular beam is sampled by the thin mirror 34, which successively reflects portions of the tubular beam (thus breaking down said beam into light samples) and the thus formed light samples are successively detected by the photodetector 44. Appropriate means 54, e.g. an oscilloscope, receive the signals supplied by the photodetector 44 and the signal supplied by the synchronizing assembly 48 and make it possible to analyze the angular distribution of the light intensity not passing into the optical fibre.

Thus, in this way it is possible to check the centring and axial focussing of the light beam on the entrance face of the fibre. When the focussed beam is centred on said entrance face, i.e. when the axes x and y coincide, said angular distribution is uniform and when the beam is correctly focussed on the entrance face, said uniform angular distribution passes through a minimum.

In order to better understand the use of the device shown in FIG. 4, an explanation will now be given of the regulation of the focussed light beam. To simplify the description of this operating procedure, it is assumed that the laser 6 operates in a quasi-continuous manner, the period or cycle of the light pulses produced by said laser being e.g. approximately 500 Hz.

With the thin mirror 34 rotated by the motor 40 and the assembly 48 supplying a synchronization signal for each rotation of the mirror 34, the starting stage consists of checking and correcting the centring error of the focussing "point" on the entrance face of the optical fibre 4.

As can be seen in FIG. 6A, when there is a centring error, the beam of axis y which is focussed on the entrance face 54 of the fibre and which forms a focal spot 56 on said entrance face does not coincide with the axis y of the fibre. The light 58, which is sampled by the truncated cone-shaped mirror 24, does not have a symmetry of revolution around the axis y.

Consequently, the intensity of the light beam received by the photodetector 44 varies when the thin mirror 34 rotates and the same applies for the voltage signal S supplied by said photodetector 44.

This is illustrated in FIG. 6B, where it is possible to see, as a function of the rotation angle A of the thin mirror 34, the variations of said signal S, as well as the variations of the synchronization signal t, which is formed from synchronizing pulses. In the represented embodiment, the latter coincide with the minima of the voltage signal S.

By controlling the motors 18 and 20 by not shown means, it is then possible to tilt the assembly of the focussing head 10 in order to recentre the focussing point on the entrance face of the optical fibre. This recentring is diagrammatically illustrated by FIG. 7A.

FIG. 7B shows the signal S which is then supplied by the photodetector 44. This signal S no longer has periodic maxima as in the case of FIG. 6B. Its intensity is independent of the angle A because, in the case where the beam is centred on the entrance face of the fibre, the angular distribution of the intensity of the light penetrating the fibre is uniform.

Along the axis y, a search then takes place for the position of the focussing point leading to a minimum for the light energy sampled around the fibre by the truncated cone-shaped mirror 24. For this purpose, using the motor 14, the focussing lens 8 is displaced until a minimum voltage signal is supplied by the photodetector 44. This is diagrammatically illustrated by FIG. 8, which shows the voltage signal S during said seeking of the optimum axial position of the focal spot.

It is possible to see the signal S obtained in the case of an overfocussing (curve I), in the case of an underfocussing (curve II) and finally in the case of the sought focussing (curve III).

It can be seen that during the translation of the lens 8, there is an asymmetry of the distribution of the lighting power around the fibre 4, which indicates that the incident light beam 2 is poorly centred on said lens 8, hence a deterioration in the focussing quality. Using not shown means and which do not form part of the invention, it is then possible to recentre the incident beam 2 on said lens 8.

Following this correction of the centring of the beam on the lens 8, there is a recommencement of the correction of the centring error on the fibre 4 and then the correction of the axial focussing error on the fibre and so on until the centring and focussing are correct.

It should be noted that it is possible to manually control the motors 14, 18 and 20 or provide an automatic control for the same, using not shown control means receiving at the input the synchronizing signals supplied by the assembly 48, as well as the signals supplied by the photodetector 44 and which as a consequence control the motors 14, 18 and 20 until the centring and axial focussing of the beam on the optical fibre 4 are obtained.

In this case, the centring and axial focussing errors are corrected by servocontrol means, which are more particularly usable during power laser machining operations.

FIG. 9 diagrammatically shows another embodiment of the checking device according to the invention. The embodiment of FIG. 9 differs from that of FIG. 4 by the sampling means. In the case of FIG. 9, the thin mirror 34 of FIG. 4 installed on the rotary ring 36, is replaced by an assembly incorporating a rotary, perforated part 60 and a fixed, perforated plane mirror 62. More specifically, the part 60 is positioned facing the sample taking assembly 22 and has a symmetry of revolution about axis y.

The part 60 is mobile about its axis y by means of a ball bearing 64 and it is rotated by the motor 40 by means of the belt 42, which passes through a hole in the wall of the focussing head 10. Moreover, the part 60 has a first central hole 66, whose axis is axis y and which is traversed by the beam focussed by the lens 8, together with another lateral hole 68 forming a thin rectangular slit extending perpendicular to the axis y (cf. FIG. 10).

This rectangular slit 68 faces the truncated cone-shaped mirror 26 in such a way that it is traversed by part of the tubular beam reflected by said mirror 26. The mirror 62 is placed between the lens 8 and the part 60 and is inclined by 45° on the axis y, as can be seen in FIG. 9. Moreover, the mirror 62 has a central hole, which is traversed by the beam focussed by the lens 8.

The mirror 62 is fixed and receives parts of the tubular beam (light sample) which are successively selected by the slit 68 when the part 60 rotates and serves to reflect these successive light samples towards the detector 44.

In the case of FIG. 9, the synchronizing assembly 48 is placed in the focussing head 10 facing the upper face of the part 60 (i.e. the face turned towards the mirror 62). This face is also provided with a non-light-reflecting bar, so that a synchronizing pulse is obtained for each rotation of the part 60.

It should be noted that the lower face of the part 60, which faces the sample taking assembly 22, is slightly conical and made reflecting in order to reflect the non-sampled light beam by means of a slit 68 towards a cooled area of the sample taking assembly 22.

All this makes it possible to check the centring and axial focussing of the beam focussed on the optical fibre 4 and the centring and axial focussing settings are identical to those explained hereinbefore.

FIG. 11 diagrammatically shows a third embodiment of the device according to the invention, which differs from that of FIG. 9 by the fact that the part 60, the motor 40 and the associated belt 42 are eliminated. In addition, the photodetector 44 is replaced by a CCD-type bidimensional photodetector 70.

In this case, the complete tubular beech 52 from the truncated cone-shaped mirror 26 is reflected by the perforated plane mirror 62 and an image is formed, by means of the lens 46, on the bidimensional photodetector 70. The synchronizing assembly 48 is also eliminated in the device of FIG. 11.

The signals supplied by the bidimensional photodetector 70 are supplied to appropriate electronic processing means 72 making it possible to directly obtain on a video monitor 74 a bidimensional image, with information on the intensity level for each point of the matrix of the bidimensional photodetector 70.

It is then possible to manually or automatically activate the motors 14, 18 and 20, as explained hereinbefore, in order to correct the centring and axial focussing errors of the light beech on the optical fibre 4.

The devices according to the invention described with reference to FIGS. 4 to 11 e.g. make it possible to introduce a bean supplied by a YAG laser and having a power above 1 kW into a hostile medium, with a transmission of the lighting power by an optical fibre, e.g. for the dismantling, decontamination or repair of a nuclear installation.

These devices can also be used in the industry for machining operations, e.g. by means of optical fibres, and make it possible to increase the life of the entrance face of said fibres and/or transmit higher lighting power levels by means of said fibres.

With reference to FIGS. 12 and 13 a description will now be given of another device according to the invention once again making it possible to check the coincidence between the axis of a light bean and a working axis (reference can also be made to the checking of the "pointing" of said light beam).

Such a device is e.g. usable with a power laser beam for which the optical transportation fibres are not commercially available.

FIG. 12 shows a laser 6, which produces a laser beam 2, whose axis is designated x and it is wished to check the coincidence between the axis x and a working axis y. The device of FIG. 12 comprises, in a frame 76 which is traversed by the laser beam 2, the perforated plane mirror 62 at 45° from the axis y, as well as the focussing lens 46 and the photodetector 44. The device of FIG. 12 also comprises a drum 78, which rotates about said axis y in the frame 76 by means of a ball bearing 80.

A motor 82 is provided for rotating the drum 78, e.g. by means of a toothed wheel 84 driving a spur ring formed on the outer wall of the drum 78. The latter has a central hole to permit the passage of the laser beam 2.

The device of FIG. 12 also comprises a sample taking and sampling assembly 86 mounted on the drum 78 in the frame 76. This assembly 86 comprises a first thin, plane mirror 88 forming an angle of 45° with the axis y and which samples a small fraction of the laser beam 2 on its periphery. Thus, when the drum 78 rotates about the axis y, a small fraction of the laser beam is sampled along a circle, whose axis is the axis y.

The assembly 86 also comprises a second, plane, thin mirror 90, which also forms an angle of 45° with the axis y and which faces the first mirror 88, as can be seen in FIGS. 12 and 13. This second mirror 90 receives the light sampled by the mirror 88 and reflected by the latter and directs the light towards the perforated, plane mirror 62, which reflects said light onto the photodetector 44 via the lens 46.

Thus, for each position of the assembly 86, a sample of the laser beam 2 is formed and this sample analyzed, so that by rotating the drum 78 there is a successive analysis of the samples of the laser beam 2.

This analysis takes place in a plane perpendicular to the axis y and passing through a precise point 0 of said axis y and at which is located the end of the mirror 88. It is therefore possible to check the pointing of the laser beam at a precise point of the beam trajectory.

Thus, in the manner described hereinbefore, if the axes x and y coincide, the angular distribution of the lighting intensity sampled around the axis y must be uniform (in order to have synchronizing pulses use is once again made of a synchronization assembly not shown in FIG. 12, but visible in FIG. 14).

As can be seen in FIG. 12, the sample taking and sampling assembly 86 is regulatable in translation perpendicular to the axis y, e.g. by means of a clamping screw 92 traversing a radial slit of the drum 78. Such a translation makes it possible to regulate the sampled light energy quantity. In addition, said translation makes it possible to adapt the device of FIG. 12 to different light beam diameters.

The device of FIG. 12 also makes it possible to obtain information on the shape of the laser beam 2. Thus, e.g., if said beam has a tendency to be oval, this indicates that it is necessary to retouch the mirrors of the cavity of the laser 6.

As has been seen, said device makes it possible to centre the beam with respect to the rotation axis of the drum 78 and therefore define a reference frame for introducing said laser beam into an optical device or into a laser machining machine. In real time, said device also gives information making it possible to make the laser beam position dependent on a nominal value.

In particular, two devices according to FIG. 12 arranged successively materialize a single direction.

Another device according to the invention is diagrammatically shown in FIG. 14. The latter uses the sample taking and sampling procedure used in the device of FIG. 12 for checking the pointing of a laser beam, but the device of FIG. 14 can also be adapted to the introduction of a light beam into an optical fibre, as can be seen in FIG. 14. Thus, the device of FIG. 14 is identical to that of FIG. 9, except that in the case of FIG. 14, the assembly 22 only has the truncated cone-shaped mirror 24, the truncated cone-shaped mirror 26 being eliminated.

At the location of said mirror 26, the assembly 22 has a cylindrical wall parallel to the axis y, which receives the light sampled by the mirror 24.

Moreover, the part 60 is eliminated and replaced by the drum 78 of FIG. 12, which is controlled by the motor 40 via the belt 42 and mounted on the ball bearing 64 in the focussing head 10 in order to rotate about the axis y.

FIG. 14 also shows the synchronization assembly 48, which supplies a synchronizing pulse for each rotation of the drum 78 and which for this purpose is mounted facing the upper face of the drum 78 (said face facing the perforated, plane mirror 62).

Use is once again made e.g. of a strip which does not reflect light and which is placed on said upper face facing the synchronization assembly 48. As a result of the signals supplied by the photodetector 44, it is again possible to check the centring and axial focussing of the laser beam 2 on the optical fibre 4.

In the case of FIG. 14, said check is carried out by means of an analysis of the laser beam upstream of the entrance face of the optical fibre 4 and not level with said entrance face.

I claim:

1. Device for aligning an axis (x) of a light beam with a working axis (y), said device comprising:
sample taking means and detection means for sampling a peripheral part of the light beam along a circle having a center on the working axis (y) and for detecting the sample light to analyze the angular distribution of the corresponding light intensity, the angular distribution being uniform when the axis of the light beam coincides with the working axis.

2. Device according to claim 1, wherein the sample taking means and detection means incorporate a first truncated cone-shaped mirror (24), whose axis coincides with the working axis (y) and which has at its apex a hole centred on the working axis and which serves to sample the said part of the light beam along said circle and reflect the thus sampled light, a second truncated cone-shaped mirror (26), whose axis also coincides with the working axis (y), which is integral with the first truncated cone-shaped mirror (24) and surrounds the latter and which reflects the light reflected by the first truncated cone-shaped mirror and means (34, 40, 44; 60, 40, 44; 62, 70) for detecting the light reflected by the second truncated cone-shaped mirror.

3. Device according to claim 2, wherein the sample taking means and detection means incorporate sampling means (34, 40, 60) for sampling the light reflected by the second truncated cone-shaped mirror (26) and a photodetector (44) for detecting the successively formed light samples, said photodetector (44) making it possible to analyze said angular distribution.

4. Device according to claim 3, wherein the sampling means incorporate a third mirror (34), which is located on the path of the light reflected by the second truncated cone-shaped mirror (26) in order to intercept part of said light, which reflects towards the photodetector (44) said intercepted part and which rotates about an axis (z), which meets the working axis (y) and means (40) for rotating the third mirror (34) about said rotation axis (z) so as to successively form the light samples.

5. Device according to claim 3, wherein the sampling means incorporate a member (60) positioned facing the second truncated cone-shaped mirror (26), which has a central hole (66) to permit the passage of the light beam (2) directed towards the sample taking means and a lateral hole (68) to permit the passage of part of the light reflected by said second truncated cone-shaped mirror (26) and which rotates about the working axis (y), means (40) for rotating said member (60) around the working axis, so that said member permits the passage of successive light samples and a third mirror (62) having a central hole (66) for permitting the passage of the light beam (2) directed towards the sample taking means and which receives successive light samples and reflects them towards the photodetector (44).

6. Device according to claim 2, wherein the sample taking means and detection means incorporate a third mirror (62) having a central hole (66) for permitting the passage of the light beam (2) directed towards the sample taking means and which is positioned facing the second truncated cone-shaped mirror (26) in order to intercept the light reflected by the latter and a bidimensional photodetector (70) for receiving the light reflected by the third mirror (62), said photodetector (70) permitting an overall analysis of said angular distribution.

7. Device according to claim 1, wherein the sample taking means and detection means incorporate a sample taking and sampling assembly having a first mirror (88) inclined with respect to the working axis (y) and provided for sampling part of the beam (2) at the periphery thereof, along said circle and for reflecting said sampled part, a second mirror (90) inclined with respect to the working axis (y), which is integral with the first inclined mirror (88) and which reflects the light reflected by said first inclined mirror and means (82) for rotating the assembly formed by the first (88) and second (90) inclined mirrors about the working axis (y), a third mirror (62) provided with a central hole for permitting the passage of the light beam directed towards the sample taking and sampling assembly and which intercepts the light reflected by the second inclined mirror and a photodetector (44) for detecting the light reflected by the mirror (62), said photodetector (44) permitting the analysis of said angular distribution.

8. Device according to claim 7, further comprises means (92) for the translation of the assembly formed by the first (88) and second (90) inclined mirrors, perpendicular to the working axis (y).

9. System for the introduction of a light beam into an optical fibre (4), said system incorporating means (8) for focussing the light beam (2) onto the entrance face of the optical fibre, wherein it also comprises the device according to claim 1, wherein the working axis (y) is the axis of the core of the optical fibre and wherein said circle is in the plane of the entrance face of said fibre (4), the device then making it possible to also check the focussing of the light beam on the entrance face of the fibre, the lighting intensity of the detected light being at a minimum when said focussing is performed.

10. System according to claim 9, wherein the sample taking means and detection means incorporate a first truncated cone-shaped mirror (24), whose axis coincides with the working axis (y) and which has at its apex a hole centred on the working axis and which samples the part of the light beam along said circle and reflects the thus sampled light, a second truncated cone-shaped mirror (26), whose axis also coincides with the working axis (y), which is integral with the first truncated cone-shaped mirror (24) and surrounds the latter and reflects the light reflected by said first truncated cone-shaped mirror and means (34, 40, 44; 60, 40, 44; 62, 70) for detecting the light reflected by the second truncated cone-shaped mirror and wherein the system also comprises means (32) for injecting a fluid within the first truncated cone-shaped mirror (24) towards the entrance face of the optical fibre (4) in order to cool the latter.

* * * * *